United States Patent Office

2,877,258
Patented Mar. 10, 1959

2,877,258

ALIPHATIC TRICHLOROMETHYLTHIO-SULFONATES

William B. Hardy and John F. Hosler, Bound Brook, N. J., and Glentworth Lamb, Stamford, Conn., assignors to American Cyanamid Company, New York, N. Y., a corporation of Maine No Drawing. Application June 27, 1955
Serial No. 518,407

6 Claims. (Cl. 260—453)

The present invention relates to new and useful trichloromethylthiosulfonate compounds which correspond to the formula $$R(-SO_2SCCl_3)_n$$

wherein R is an aliphatic radical selected from the group consisting of alkyl, aralkyl, alkenyl and alicyclic radicals, and $n$ is an integer selected from the group consisting of one and two.

The above compounds can be readily prepared by bringing together a sulfonyl chloride corresponding to the formula $$R(-SO_2Cl)_n$$

in which R and $n$ have the same meaning as stated above, and an alkali metal salt of sulfurous acid in an aqueous medium preferably maintained at a temperature of from about 0° to about 50° C. As the reaction proceeds under vigorous agitation, aqueous alkali metal hydroxide is added gradually to maintain a substantially neutral pH. The reaction mixture is then diluted with water to about twice its volume to allow more efficient stirring, and perchloromethylmercaptan (ClSCCl₃), approximately equivalent to the sulfonyl chloride employed, is added while the temperature is maintained within the range of from about 0° to about 50° C. The thus-formed trichloromethylthiosulfonate is easily separated from the reaction mixture by conventional means, i. e., filtration, layer separation or extraction with organic solvents.

Typical alkali metal salts of sulfurous acid which may be employed in the process are sodium sulfite, potassium sulfite, lithium sulfite, sodium metabisulfite, potassium metabisulfite and the like.

Various sulfonyl chlorides are utilized in preparing the compounds of this invention. Examples of such sulfonyl chlorides are alkyl sulfonyl chlorides such as methane, ethane, propane, butane, and pentane sulfonyl chlorides and the like; aralkyl sulfonyl chlorides such as phenylmethane sulfonyl chloride, phenylethane sulfonyl chloride, 1-naphthylmethane sulfonyl chloride and the like; alkenyl sulfonyl chlorides such as propene sulfonyl chloride, isobutylene sulfonyl chloride and the like; alicyclic sulfonyl chlorides such as cyclohexane sulfonyl chloride, cyclopentane sulfonyl chloride, decalin sulfonyl chloride and the like.

The alkyl, alkenyl, aralkyl and alicyclic radicals in the above sulfonyl chlorides may be substituted with various groups such as halogen, alkoxy, nitro, cyano and similar groups.

The invention will be more particularly illustrated by the following examples in which all parts are by weight unless otherwise indicated.

EXAMPLE 1

*Trichloromethyl methanethiosulfonate*

A slurry of 23 parts of methanesulfonyl chloride, 37 parts of sodium sulfite and 150 parts of water is stirred at 5–10° C., and maintained at a neutral pH by the gradual addition of 25% aqueous sodium hydroxide. The reaction mixture is diluted with an equal volume of water, and 37 parts of perchloromethylmercaptan is added during one hour. After stirring for an additional hour, the reaction mixture is filtered, giving 28 parts of the white crystalline product melting at 54–54.5° C.

EXAMPLE 2

*Trichloromethyl ethanethiosulfonate*

A mixture of 26 parts of ethanesulfonyl chloride, 37 parts of sodium sulfite and 150 parts of water is stirred at 10–15° C., and maintained at a neutral pH by the gradual addition of 32 parts of 50% aqueous sodium hydroxide. The reaction mixture is treated with 37 parts of perchloromethylmercaptan during a period of one hour, and then extracted with hexane. The hexane solution is dried and evaporated under vacuum. The product, an orange-colored oil, is obtained in good yield.

EXAMPLE 3

*Trichloromethyl butane-1-thiosulfonate*

The procedure of Example 2 is employed using 31.3 parts of 1-butane-sulfonyl chloride in place of the ethanesulfonyl chloride. The product is a viscous colorless oil.

EXAMPLE 4

*Trichloromethyl cyclohexanethiosulfonate*

The procedure of Example 1 is employed by using 36.5 parts of cyclohexanesulfonyl chloride in place of the methanesulfonyl chloride. The product is a white crystalline solid melting at 47–50° C.

EXAMPLE 5

*Bis-1,4-trichloromethyl butane-bis-thiosulfonate*

A slurry of 25.5 parts of butane-1,4-bis-sulfonyl chloride, 50 parts of sodium sulfite and 50 parts of water is stirred at 10–20° C. for eight hours, and held neutral by the gradual addition of aqueous sodium hydroxide. The reaction mixture is diluted with an equal volume of water, and 35 parts of perchloromethylmercaptan is added during one-half hour. After stirring for an additional hour, the reaction mixture is filtered, giving the white crystalline product in good yield.

EXAMPLE 6

*Trichloromethyl phenylmethanethiosulfonate*

A slurry of 26 parts of phenylmethanesulfonyl chloride and 35 parts of sodium sulfite in 150 parts of water is shaken for 4 hours and maintained at a pH of 6 to 8 by the gradual addition of aqueous sodium hydroxide. The reaction mixture is warmed and filtered. After cooling, the filtrate is acidified with concentrated hydrochloric acid and the phenylmethanesulfinic acid is filtered off. The wet cake is dissolved in sufficient dilute aqueous sodium hydroxide to give a neutral solution, and then treated with 20 parts of perchloromethylmercaptan. The white solid is filtered off and dried, yielding 20 parts of the product melting at 83–84° C.

While in the foregoing examples the preparation of various aliphatic trichoromethylsulfonates have been shown, other analogous compounds of similar structure are equally within the purview of this invention, such as Trichloromethyl octane-1-thiosulfonate
Trichloromethyl decane-1-thiosulfonate
Trichloromethyl dodecane-1-thiosulfonate
Trichloromethyl octadecane-1-thiosulfonate Trichloromethyl 1-phenylethane-2-thiosulfonate
Trichloromethyl 1-naphthylmethanethiosulfonate
Trichloromethyl propenethiosulfonate
Trichloromethyl isobutylenethiosulfonate
Trichloromethyl cyclopentanethiosulfonate
Bis-1,3-trichloromethyl propane-bis-thiosulfonate
Bis-1,5-trichloromethyl n-penante-bis-thiosulfonate
Bis-1,8-trtichloromethyl n-octane-bis-thiosulfonate The compounds of the present invention are highly effective in preventing and retarding fungus growth on seeds, soils, plants, fruit, wood, fur, wool, cotton, leather, and other organic matter. They may be applied as sprays in organic solvents, as emulsions in water or other non-solvents, or on solid carriers such a clays, talcs, diatomaceous earths and the like.

Aqueous dispersions of the aliphatic trichloromethyl-thiosulfonates of the present invention give 90–100% kills of the spores of the fungi *Sclerotinia fructigena* and *Macrosporium sarcinaeforme* at a concentration of 0.001%.

While the invention has been described with particular reference to specific embodiments, it is to be understood that it is not to be limited thereto but is to be construed broadly and restricted solely by the scope of the appended claims.

We claim:

1. A trichloromethylthiosulfonate corresponding to the formula $$R(-SO_2SCCl_3)_n$$

where R is selected from the group consisting of alkyl, phenylalkyl and cyclohexyl and $n$ is an integer selected from the group consisting of one and two.

2. Trichloromethyl methanethiosulfonate.
3. Trichloromethyl ethane thiosulfonate.
4. Trichloromethyl butane-1-thiosulfonate.
5. Trichloromethyl cyclohexanethiosulfonate.
6. Bis-1,4-trichloromethyl butane-bis-thiosulfonate.

References Cited in the file of this patent

Backer et al.: Rec. Trav. Chim. 71, 1082–1085 (1952).
Chien-Pen Lo et al.: J. A. C. S. 76, pp. 1704–05 (1954).